United States Patent Office 3,037,964
Patented June 5, 1962

3,037,964
LINEAR COPOLYESTERS OF TEREPHTHALIC
AND CHLOROTEREPHTHALIC ACIDS
Herman A. Bruson, North Haven, Conn., and Charles D. Mason, Morristown, N.J., assignors to Olin Mathieson Chemical Corporation, New Haven, Conn., a corporation of Virginia
No Drawing. Filed May 21, 1958, Ser. No. 736,714
2 Claims. (Cl. 260—75)

This invention relates to novel linear copolyesters and particularly to copolymers of a glycol terephthalate with a glycol monochloro- or dichloroterephthalate.

The objects of the invention have included mainly the provision of thermoplastic compositions of improved physical and chemical properties and process therefor. A further object has been to provide linear copolyesters of terephthalic and chloroterephthalic acids characterized by advantageous properties and ease of preparation.

The foregoing and other objects have been accomplished in accordance with this invention by the provision of copolyesters formed from about 50 to 95% by weight of a glycol terephthalate with about 5 to 50% by weight of a glycol monochloro- or dichloroterephthalate.

Monomeric or low molecular weight mixtures of the above-stated compositions have been found to be readily polymerizable to linear high polymers of highly advantageous properties. Polymerization conditions such as type and concentration of catalyst, temperature and time may be employed comparable to those effective for the preparation of polymerized ethylene terephthalate. In contrast, attempts to produce linear polyesters from monomeric chloroterephthalates alone or admixed with less than about 50% by weight of a glycol terephthalate require prolonged and more drastic reaction conditions and result in highly colored products characterized by inadequate physical properties.

The decreased reactivity of the chloroterephthalates is probably due to the steric effect of the nuclear substituted chlorine atoms, which increases to such an extent that it is practically impossible to form colorless high molecular weight polyesters by condensation of the monomeric glycol esters of tri- or tetrachloroterephthalic acid.

However, within the proportions in accordance with this invention, high molecular weight copolyesters are obtained which are suitable for the production of high quality synthetic fibers, filaments and film which are substantially colorless and characterized by excellent strength and highly desirable electrical properties. In particular, such copolymers display unusual and enhanced resistance to hydrolytic reagents which under the same conditions effect degradation of polyethylene terephthalates. Also, the copolymers of this invention are more resistant to attack by fungi and microorganisms which effect the deterioration of articles made of polyethylene terephthalate, especially during storage under hot and humid conditions.

The mono- and dichloroterephthalic acids are readily available through oxidation of monochloroxylene and of 2,5-dichloroxylene, respectively, either by catalytic oxidation with molecular oxygen or by liquid phase oxidation with nitric acid or other oxidizing agent. The purified acid, substantially free of any monocarboxylic acid may be esterified by a conventional process to yield a lower alkyl diester, such as the dimethyl ester.

The desired proportions of the dimethyl ester and dimethylterephthalate, within the above-stated limits, are then combined with a glycol of formula $$HO(CH_2 \cdot CH_2)_n OH$$

where $n$ is a small whole number from 1 to 4, preferably ethylene glycol, and a small proportion of transesterification and polymerization catalyst, such as alkali metal alkoxide or hydride, alkaline earth metal acetate, litharge, or antimony oxide. The mixture is heated at about 175°–280° C. in a stream of nitrogen or other inert gas and the polymerization is completed under vacuum at a temperature near the upper limit stated.

Illustrative embodiments of this invention are described in the following specific examples.

Example 1

Dimethyl chloroterephthalate was prepared as follows. A mixture of 35 g. (0.174 mole) of chloroterephthalic acid, 17.5 g. (0.17 mole) of sulfuric acid and 175 ml. of methanol was maintained under reflux for two hours. Then, the clear solution was poured into a liter of ice-water. The resulting precipitate was filtered, washed with water and dried. It was dissolved in 150 ml. of ether and the ethereal solution was washed with two 50 ml. portions of a 10% sodium carbonate solution. The ethereal solution of the dimethyl ester was evaporated and the residue was recrystallized from methyl alcohol. The purified product consisted of 26.0 g. of ester of M.P. 59–60° C.

Example 2

Dimethyl 2,5-dichloroterephthalate was prepared in accordance with the above procedure resulting in a similar yield of the purified ester, which had a melting point of 137°–138° C.

Examples 3–7

Polymerizations were carried out with mixtures of dimethyl terephthalate and dimethyl chloroterephthalate in the desired proportion containing 70% of ethylene glycol, 0.07% of calcium acetate monohydrate and 0.06% of antimony oxide, all based on the total weight of the esters. The mixture was heated at 188° C. in a stream of nitrogen for the period indicated in the table and then at about 245°–280° C. under a vacuum of 0.1 to 0.25 mm. mercury for the indicated period.

| Example | Percent by weight chloroterephthalate | Hours at 188 °C. | Final Temp., °C. | Hours at Final Temp. | Final Pressure, mm. Hg |
|---|---|---|---|---|---|
| 3 | 10 | 8 | 281 | 3 | 0.25 |
| 4 | 10 | 6¾ | 265 | 3 | 0.2 |
| 5 | 20 | 16 | 245 | 4 | 0.25 |
| 6 | 30 | 13 | 245 | 6 | 0.1 |
| 7 | 40 | 16 | 245 | 6 | 0.1 |

The resulting copolymers displayed the following properties.

| Example | Melting Point, °C. | Intrinsic Viscosity | Percent Cold Drawability |
|---|---|---|---|
| 3 | 241–244 | 0.67 | 550 |
| 4 | 238–244 | 0.5 | 500 |
| 5 | 242–245 | 0.40 | 600 |
| 6 | 205–210 | 0.45 | 500 |
| 7 | 185–188 | 0.48 | 400 |

Example 8

Copolyesters of ethylene terephthalate and ethylene 2,5-dichloroterephthalate were prepared containing 5 to 50% by weight of the dichloroterephthalate in accordance with the procedure of the above examples, reaction time being 10–20 hours at 188° C. and 4–6 hours at about 245° C. The resulting polymers displayed melting points ranging from 155° C. to about 245° C. at 50% to 95% by weight of terephthalate respectively, intrinsic viscosity of 0.4–0.5, and cold drawability of 300–500%.

Likewise, useful ternary copolyesters may readily be prepared in accordance with the above procedure by transesterification and polymerization of glycol terephthalate with mixtures of glycol mono- and dichlorophthalate, containing 5 to 50% by weight of the chlorophthalates. While ethylene glycol is the preferred glycol, it may be replaced in part or entirely by another glycol containing up to eight carbon atoms or by a mixture of such glycols.

In contrast to the above successful polymerizations resulting in high molecular weight, colorless to slightly yellowish, tough thermoplastic resin, dimethyl chloroterephthalate with the same concentration of the identical catalysts required heating for 25 to 30 hours at 188° C. followed by 10 hours at 245° C. to result in a polymer of fairly high molecular weight. However, this product was a deep brown, amorphous and brittle solid, incapable of being cold-drawn.

The preferred copolyesters of this invention are the ethylene terephthalate-chloroterephthalate copolymers containing 10%–30% by weight of the chloroterephthalate as they are readily prepared in substantially colorless state, having highly advantageous physical, electrical and chemical properties. Colorless films can readily be prepared from the above preferred copolyesters by the conventional extrusion processes and can be oriented longitudinally or both longitudinally and transversely by cold drawing and setting under tension at a higher temperature. Film samples within the above preferred range have displayed a dielectric constant of 3.48 and loss factor of 0.080, as compared, respectively, to values of 3.51 and 0.098 for polyethylene terephthalate film.

The obtainment of excellent strength and electrical properties in the novel copolyesters is particularly advantageous because they are obtained in combination with unusual resistance to hydrolysis and to deterioration by microorganisms and fungi, not heretofore available.

We claim:

1. A random linear copolyester characterized by an intrinsic viscosity greater than about 0.40 and resulting from heating at 175°–280° C. in the presence of a small proportion of esterification and polymerization catalyst a mixture of monomeric reactants consisting essentially of ethylene glycol and a mixture of 50% to 95% by weight of a lower alkyl diester of terephthalic acid and 5% to 50% by weight of a lower alkyl diester of chloroterephthalic acid containing one to two nuclear chlorine atoms, said percentages by weight being based on the total weight of the mixture of said lower alkyl diesters.

2. A random linear copolyester characterized by an intrinsic viscosity greater than about 0.40 and resulting from heating at 175°–280° C. in the presence of a small proportion of esterification and polymerization catalyst a mixture of monomeric reactants consisting essentially of ethylene glycol and a mixture of 70% to 90% by weight of a lower alkyl diester of terephthalic acid and 10% to 30% by weight of a lower dialkyl ester of chloroterephthalic acid, said percentages by weight being based on the total weight of the mixture of said lower alkyl diesters.

References Cited in the file of this patent

UNITED STATES PATENTS 2,551,732  Drewitt et al. _____ May 8, 1951

FOREIGN PATENTS 728,550  Great Britain _____ Apr. 20, 1955